(12) United States Patent
Rais-Ghasem et al.

(10) Patent No.: US 10,013,455 B2
(45) Date of Patent: *Jul. 3, 2018

(54) ENABLING BUSINESS INTELLIGENCE APPLICATIONS TO QUERY SEMANTIC MODELS

(71) Applicant: International Business Machines Corporation, Armonk, NY (US)

(72) Inventors: Mohsen Rais-Ghasem, Ottawa (CA); Michael E. Styles, Osgoode (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,099

(22) Filed: Mar. 14, 2014

(65) Prior Publication Data

US 2014/0201196 A1   Jul. 17, 2014

Related U.S. Application Data

(63) Continuation of application No. 13/705,030, filed on Dec. 4, 2012.

(51) Int. Cl.
*G06F 17/30* (2006.01)

(52) U.S. Cl.
CPC .. *G06F 17/30424* (2013.01); *G06F 17/30684* (2013.01); *G06F 17/30991* (2013.01)

(58) Field of Classification Search
CPC .............. G06F 17/30; G06F 17/30392; G06F 17/30427; G06F 17/30563; G06F 17/30731; G06F 17/30734
See application file for complete search history.

(56) References Cited

U.S. PATENT DOCUMENTS

| | | | |
|---|---|---|---|
| 5,627,979 A | 5/1997 | Chang et al. | |
| 6,609,123 B1 * | 8/2003 | Cazemier et al. | |
| 7,716,163 B2 | 5/2010 | Reynar et al. | |
| 7,739,224 B1 * | 6/2010 | Weissman et al. | ........... 707/794 |
| 7,877,421 B2 | 1/2011 | Berger et al. | |
| 8,478,766 B1 * | 7/2013 | Tsypliaev | .......... G06F 17/30566 705/7.11 |
| 2004/0034651 A1 * | 2/2004 | Gupta | ............... G06F 17/30932 |
| 2004/0054690 A1 * | 3/2004 | Hillerbrand | ............ G06Q 10/06 |

(Continued)

OTHER PUBLICATIONS

"Semantic TechnologiestLeveranginBI", Denilson Sell, 2008, (1-11) pages.*

(Continued)

*Primary Examiner* — Augustine Obisesan
(74) *Attorney, Agent, or Firm* — Janaki K. Davda; Konrad, Raynes, Davda and Victor LLP

(57) ABSTRACT

Provided are a computer implemented method, computer program product, and system for generating a combined report. One or more queries are constructed using a Business Intelligence (BI) metadata model and one or more query declarations. The one or more queries are executed on a semantic model to obtain one or more semantic result sets. One or more data source result sets are received from one or more data sources. The one or more semantic result sets and the one or more data source result sets are combined to construct one or more combined result sets. The one or more combined result sets are rendered to form a combined report.

3 Claims, 17 Drawing Sheets

(56) References Cited

U.S. PATENT DOCUMENTS

| | | | |
|---|---|---|---|
| 2004/0083199 A1 | 4/2004 | Govindugari et al. | |
| 2005/0050068 A1* | 3/2005 | Vaschillo et al. | 707/100 |
| 2005/0278304 A1* | 12/2005 | Da Silva | G06F 17/3056 |
| 2006/0010102 A1 | 1/2006 | Labossiere et al. | |
| 2006/0112109 A1* | 5/2006 | Chowdhary | G06F 17/30607 |
| 2006/0242624 A1 | 10/2006 | Mueller-Klingspor | |
| 2006/0259458 A1* | 11/2006 | Hunter et al. | 707/2 |
| 2007/0022107 A1 | 1/2007 | Yuan et al. | |
| 2007/0033212 A1* | 2/2007 | Fifield | G06Q 10/00 |
| 2007/0061318 A1* | 3/2007 | Azizi | G06F 17/30386 |
| 2007/0112718 A1 | 5/2007 | Liu et al. | |
| 2007/0220004 A1 | 9/2007 | Fifield et al. | |
| 2007/0233457 A1* | 10/2007 | Kang | G06F 17/30734 704/8 |
| 2007/0299805 A1 | 12/2007 | Belinson | |
| 2008/0040308 A1* | 2/2008 | Ranganathan | G06F 17/30595 |
| 2008/0046422 A1* | 2/2008 | Lee | G06F 17/3043 |
| 2008/0046427 A1* | 2/2008 | Lee | G06F 17/3043 |
| 2008/0059449 A1* | 3/2008 | Webster | G06F 17/30412 |
| 2008/0082494 A1* | 4/2008 | Polo-Malouvier | G06F 17/30398 |
| 2008/0306984 A1 | 12/2008 | Friedlander et al. | |
| 2009/0138436 A1* | 5/2009 | Halberstadt | G06F 8/35 |
| 2009/0249294 A1 | 10/2009 | Ocke et al. | |
| 2010/0218134 A1* | 8/2010 | B'Far | G06Q 10/00 715/780 |
| 2011/0093469 A1 | 4/2011 | B'Far et al. | |
| 2011/0173220 A1* | 7/2011 | Jung | G06Q 10/06 707/769 |
| 2011/0270866 A1 | 11/2011 | Dettinger et al. | |
| 2011/0276588 A1* | 11/2011 | Moon | G06F 17/30973 707/769 |
| 2011/0295836 A1 | 12/2011 | Bolsius et al. | |
| 2012/0095973 A1* | 4/2012 | Kehoe | G06F 8/70 707/694 |
| 2012/0101860 A1* | 4/2012 | Ezzat | G06Q 10/06 705/7.11 |
| 2012/0102022 A1 | 4/2012 | Miranker et al. | |
| 2013/0262361 A1 | 10/2013 | Arroyo et al. | |
| 2014/0019437 A1* | 1/2014 | Hays et al. | 707/722 |
| 2014/0156638 A1* | 6/2014 | Joshi et al. | 707/722 |

OTHER PUBLICATIONS

Aberer, K., P. Cudre-Mauroux, A.M. Ouksel, T. Catarci, M. Hacid, A. Illarramendi, V. Kashyap, M. Mecella, E. Mena, E.J. Neuhold, O. De Troyer, T. Risse, M. Scannapieco, F. Saltor, L. De Santis, S. Spaccapietra, S. Staab, and R. Studer, "Emergent Semantics Principles and Issues", 2004, retrieved from the Internet at <URL: http://www.l3s.de/~risse/pub/P2004-01.pdf>, Total 14 pp.

Bohring, H. and S. Auer, "Mapping XML to OWL Ontologies", 2005, Total 10 pp.

Bornhovd, C., "Semantic Metadata for the Integration of Web-based Data for Electronic Commerce", 1999, Total 9 pp.

"Modeling and Query Patterns for Process Retrieval in OWL", 2009, retrieved from the Internet at <URL: http://www.uni-koblenz.de/~staab/Research/Publications/2009/ISWC2009-process-retrieval-revised.pdf>, Total 16 pp.

US Patent Application, dated Dec. 4, 2012, for U.S. Appl. No. 13/705,030 (54.81), filed Dec. 4, 2012, entitled, "Enabling Business Intelligence Applications to Query Semantic Models", invented by M. Rais-Ghasem et al., pp. 1-38.

Preliminary Amendment, dated Mar. 14, 2014, for U.S. Appl. No. 13/705,030 (54.81), filed Dec. 4, 2012, entitled, "Enabling Business Intelligence Applications to Query Semantic Models", invented by M. Rais-Ghasem et al., pp. 1-5.

Office Action, dated Sep. 29, 2014, for U.S. Appl. No. 13/705,030 (54.81), filed Dec. 4, 2012, invented by Mohsen Rais-Ghasem et al., Total 17 pages.

Response to Office Action, dated Dec. 19, 2014, for U.S. Appl. No. 13/705,030 (54.81), filed Dec. 4, 2012, invented by Mohsen Rais-Ghasem et al., Total 10 pages.

Final Office Action, Mar. 12, 2015, for U.S. Appl. No. 13/705,030, filed Dec. 4, 2012 by M. Rais-Ghasem et al., Total 18 pp. [54.81 (FOA)].

Response to Final Office Action, Jun. 9, 2015, for U.S. Appl. No. 13/705,030, filed Dec. 4, 2012 by M. Rais-Ghasem et al., Total 11 pp. [54.81 (RFOA)].

Office Action, dated Sep. 9, 2015, for U.S. Appl. No. 13/705,030 (54.81), filed Dec. 4, 2012, invented by M. Rais-Ghasem et al., Total 20 pages.

Response to Office Action, dated Dec. 8, 2015, for U.S. Appl. No. 13/705,030 (54.81), filed Dec. 4, 2012, invented by M. Rais-Ghasem et al.,Total 9 pages.

Sell et al., "SBI A Semantic Framework to Support Business Intelligence", dated 2008, Total 11 pages.

Final Office Action, dated Apr. 29, 2016, for U.S. Appl. No. 13/705,030 (54.81), filed Dec. 4, 2012, invented by M. Rais-Ghasem et al., Total 21 pages.

Response to Final Office Action, dated Aug. 24, 2016, for U.S. Appl. No. 13/705,030 (54.81), filed Dec. 4, 2012, invented by M. Rais-Ghasem et al., Total 10 pages.

Office Action, dated Dec. 19, 2016, for U.S. Appl. No. 13/705,030 (54.81), filed Dec. 4, 2012, invented by M. Rais-Ghasem et al., Total 24 pages.

Response to Office Action, dated Mar. 17, 2017, for U.S. Appl. No. 13/705,030 (54.81), filed Dec. 4, 2012, invented by M. Rais-Ghasem et al., Total 12 pages.

Notice of Allowance, dated Dec. 28, 2017, for U.S. Appl. No. 13/705,030 (54.81), filed Dec. 4, 2012, invented by M. Rais-Ghasem et al. Total 14 pages.

Final Office Action, dated Apr. 18, 2017, for U.S. Appl. No. 13/705,030 (54.81), filed Dec. 4, 2012, invented by M. Rais-Ghasem et al., Total 20 pages.

Response to Final Office Action, dated Jul. 14, 2017, for U.S. Appl. No. 13/705,030 (54.81), filed Dec. 4, 2012, invented by M. Rais-Ghasem et al., Total 11 pages.

\* cited by examiner

400

```
- <report xmlns="http:/ /developer.cognos.com/schemas/report/9.0/"
    expressionLocale="en-us" useStyleVersion="10">
  - <!--
  <modelPath>/content/package[@name='OWL
      Demo']/model[@name='model']</modelPath>
  <drillBehavior modelBasedDrillThru="true" />
- <queries>
- <query name="Query1">
- <source>
  <model />
    </source>
- <selection autoSummary="false">
- <dataItem aggregate="none" label="Name" name="name"
      rollupAggregate="none">
  <expression>[Model].[Element].[name]</expression>
- <XMLAttributes>
  <XMLAttribute name="RS_dataType" output="no" value="3" />
  <XMLAttribute name="RS_dataUsage" output="no" value="attribute" />
  </XMLAttributes>
  </dataItem>
+ <dataItem aggregate="none" label="Symbol" name="symbol"
      rollupAggregate="none">
+ <dataItem aggregate="none" label="Atomic Number" name="atomicNumber"
      rollupAggregate="none">
+ <dataItem aggregate="none" label="Atomic Weight" name="atomicWeight"
      rollupAggregate="none">
+ <dataItem aggregate="none" label="Group" name="name1"
      rollupAggregate="none">
+ <dataItem aggregate="none" label="Color" name="color" rollupAggregate="none">
    </selection>
    </query>
    </queries>
```

FIG. 4A

```
- <layouts>
- <layout>
- <reportPages>
- 
+ <style>
- <pageBody>
- <style>
- <defaultStyles>
<defaultStyle refStyle="pb" />
    </defaultStyles>
    </style>
+ <contents>
    </pageBody>
+ <pageHeader>
+ <pageFooter>

</reportPages>
    </layout>
    </layouts>

- <XMLAttributes>
<XMLAttribute name="RS_CreateExtendedDataItems" output="no" value="true"
    />
<XMLAttribute name="listSeparator" output="no" value="," />
<XMLAttribute name="RS_modelModificationTime" value="2012-02-
    16T16:22:11.567Z" output="no" />
    </XMLAttributes>
<reportName>Elements By Group</reportName>
    </report>
```

```
<owl:Class rdf:ID='Group'>
   <rdfs:subClassOf>
      <owl:Restriction>
         <owl:onProperty rdf:resource="#number"/>
         <owl:allValuesFrom rdf:resource="&xsd;integer"/>
      </owl:Restriction>
   </rdfs:subClassOf>
   <rdfs:subClassOf>
      <owl:Restriction>
         <owl:onProperty rdf:resource="#name"/>
         <owl:allValuesFrom rdf:resource="&xsd;string"/>
      </owl:Restriction>
   </rdfs:subClassOf>
   <rdfs:subClassOf>
      <owl:Restriction>
         <owl:onProperty rdf:resource="#element"/>
         <owl:allValuesFrom rdf:resource="#Element"/>
      </owl:Restriction>
   </rdfs:subClassOf>
</owl:Class>

<owl:Class rdf:ID='Period'>
   <rdfs:subClassOf>
      <owl:Restriction>
         <owl:onProperty rdf:resource="#number"/>
         <owl:allValuesFrom rdf:resource="&xsd;integer"/>
      </owl:Restriction>
   </rdfs:subClassOf>
   <rdfs:subClassOf>
      <owl:Restriction>
         <owl:onProperty rdf:resource="#element"/>
         <owl:allValuesFrom rdf:resource="#Element"/>
      </owl:Restriction>
   </rdfs:subClassOf>
</owl:Class>
```

FIG. 5A

```
<owl:Class rdf:ID='Element'>
   <rdfs:subClassOf>
      <owl:Restriction>
         <owl:onProperty rdf:resource="#name"/>
         <owl:allValuesFrom rdf:resource="&xsd;string"/>
      </owl:Restriction>
   </rdfs:subClassOf>
   <rdfs:subClassOf>
      <owl:Restriction>
         <owl:onProperty rdf:resource="#name"/>
         <owl:cardinality rdf:datatype="&xsd;nonNegativeInteger">1</owl:cardinality>
      </owl:Restriction>
   </rdfs:subClassOf>
   <rdfs:subClassOf>
      <owl:Restriction>
         <owl:onProperty rdf:resource="#symbol"/>
         <owl:allValuesFrom rdf:resource="&xsd;string"/>
      </owl:Restriction>
   </rdfs:subClassOf>
   <rdfs:subClassOf>
      <owl:Restriction>
         <owl:onProperty rdf:resource="#symbol"/>
         <owl:cardinality rdf:datatype="&xsd;nonNegativeInteger">1</owl:cardinality>
      </owl:Restriction>
   </rdfs:subClassOf>
   <rdfs:subClassOf>
      <owl:Restriction>
         <owl:onProperty rdf:resource="#atomicNumber"/>
         <owl:allValuesFrom rdf:resource="&xsd;integer"/>
      </owl:Restriction>
   </rdfs:subClassOf>
```

```
    <rdfs:subClassOf>
       <owl:Restriction>
          <owl:onProperty rdf:resource="#atomicNumber"/>
          <owl:cardinality rdf:datatype="&xsd;nonNegativeInteger">1</owl:cardinality>
       </owl:Restriction>
    </rdfs:subClassOf>
    <rdfs:subClassOf>
       <owl:Restriction>
          <owl:onProperty rdf:resource="#atomicWeight"/>
          <owl:allValuesFrom rdf:resource="&xsd;float"/>
       </owl:Restriction>
    </rdfs:subClassOf>
    <rdfs:subClassOf>
       <owl:Restriction>
          <owl:onProperty rdf:resource="#atomicWeight"/>
          <owl:cardinality rdf:datatype="&xsd;nonNegativeInteger">1</owl:cardinality>
       </owl:Restriction>
    </rdfs:subClassOf>
    <rdfs:subClassOf>
       <owl:Restriction>
          <owl:onProperty rdf:resource="#group"/>
          <owl:allValuesFrom rdf:resource="#Group"/>
       </owl:Restriction>
    </rdfs:subClassOf>
    <rdfs:subClassOf>
       <owl:Restriction>
          <owl:onProperty rdf:resource="#group"/>
          <owl:cardinality rdf:datatype="&xsd;nonNegativeInteger">1</owl:cardinality>
       </owl:Restriction>
    </rdfs:subClassOf>
```

```
<rdfs:subClassOf>
    <owl:Restriction>
        <owl:onProperty rdf:resource="#period"/>
        <owl:allValuesFrom rdf:resource="#Period"/>
    </owl:Restriction>
</rdfs:subClassOf>
<rdfs:subClassOf>
    <owl:Restriction>
        <owl:onProperty rdf:resource="#period"/>
        <owl:cardinality rdf:datatype="&xsd;nonNegativeInteger">1</owl:cardinality>
    </owl:Restriction>
</rdfs:subClassOf>
<rdfs:subClassOf>
    <owl:Restriction>
        <owl:onProperty rdf:resource="#block"/>
        <owl:allValuesFrom rdf:resource="#Block"/>
    </owl:Restriction>
</rdfs:subClassOf>
<rdfs:subClassOf>
    <owl:Restriction>
        <owl:onProperty rdf:resource="#block"/>
        <owl:cardinality rdf:datatype="&xsd;nonNegativeInteger">1</owl:cardinality>
    </owl:Restriction>
</rdfs:subClassOf>
<rdfs:subClassOf>
    <owl:Restriction>
        <owl:onProperty rdf:resource="#standardState"/>
        <owl:allValuesFrom rdf:resource="#StandardState"/>
    </owl:Restriction>
</rdfs:subClassOf>
```

```
<rdfs:subClassOf>
    <owl:Restriction>
        <owl:onProperty rdf:resource="#color"/>
        <owl:allValuesFrom rdf:resource="&xsd;string"/>
    </owl:Restriction>
</rdfs:subClassOf>
<rdfs:subClassOf>
    <owl:Restriction>
        <owl:onProperty rdf:resource="#classification"/>
        <owl:allValuesFrom rdf:resource="#Classification"/>
    </owl:Restriction>
</rdfs:subClassOf>
</owl:Class>
```

```
PREFIX : <http://www.daml.org/2003/01/periodictable/PeriodicTable#>
PREFIX rdf: <http://www.w3.org/1999/02/22-rdf-syntax-ns#>
SELECT  ?Group0_name ?Element_name ?Element_symbol
?Element_atomicNumber ?Element_atomicWeight
WHERE {
        ?s0 rdf:type :Element .
        ?s0 :name ?Element_name .
        ?s0 :symbol ?Element_symbol .
        ?s0 :atomicNumber ?Element_atomicNumber .
        OPTIONAL { ?s0 :atomicWeight ?Element_atomicWeight . }
        ?s0 :group ?Element_group .
        OPTIONAL { ?s0 :color ?Element_color . }
        ?s1 rdf:type :Group .
        ?s1 :name ?Group0_name .
        FILTER( ?Element_group = ?s1 )
}
ORDER BY ASC(?Group0_name)
```

FIG. 8

```
<Element rdf:ID="Fe">
    <name rdf:datatype="&xsd;string">iron</name>
    <symbol rdf:datatype="&xsd;string">Fe</symbol>
    <atomicNumber rdf:datatype="&xsd;integer">26</atomicNumber>
    <atomicWeight rdf:datatype="&xsd;float">55.845</atomicWeight>
    <group rdf:resource="#group_8"/>
    <period rdf:resource="#period_4"/>
    <block rdf:resource="#d-block"/>
    <standardState rdf:resource="#solid"/>
    <color rdf:datatype="&xsd;string">lustrous, metallic, greyish tinge</color>
    <classification rdf:resource="#Metallic"/>
    <casRegistryID rdf:datatype="&xsd;string">7439-89-6</casRegistryID>
</Element>
```

Elements By Group

| Group | Name | Symbol | Atomic Number | Atomic Weight | Color |
|---|---|---|---|---|---|
| Actinoid | actinium | Ac | 89 | 227 | silvery |
| | americium | Am | 95 | 243 | silvery white |
| | berkelium | Bk | 97 | 247 | unknown, but probably metallic and silvery white or grey in appearance |
| | californium | Cf | 98 | 251 | unknown, but probably metallic and silvery white or grey in appearance |
| | curium | Cm | 96 | 247 | silver |
| | einsteinium | Es | 99 | 252 | unknown, but probably metallic and silvery white or grey in appearance |
| | fermium | Fm | 100 | 257 | unknown, but probably metallic and silvery white or grey in appearance |
| | mendelevium | Md | 101 | 258 | unknown, but probably metallic and silvery white or grey in appearance |
| | nobelium | No | 102 | 259 | unknown, but probably metallic and silvery white or grey in appearance |
| | neptunium | Np | 93 | 237 | silvery metallic |
| | protactinium | Pa | 91 | 231.03588 | silvery metallic |
| | plutonium | Pu | 94 | 244 | silvery white |
| | thorium | Th | 90 | 232.0381 | silvery white |
| | uranium | U | 92 | 238.02891 | metallic grey |
| Alkali metal | caesium | Cs | 55 | 132.90545 | silvery gold |
| | francium | Fr | 87 | 223 | metallic |
| | hydrogen | H | 1 | 1.00794 | colourless |
| | potassium | K | 19 | 39.0983 | silvery white |
| | lithium | Li | 3 | 6.941 | silvery white/grey |
| | sodium | Na | 11 | 22.989770 | silvery white |

Feb 16, 2012

⤒ Top ⬆ Page up ⬇ Page down ⤓ Bottom

ENABLING BUSINESS INTELLIGENCE APPLICATIONS TO QUERY SEMANTIC MODELS

FIELD

Embodiments of the invention relate to enabling Business Intelligence (BI) applications to query semantic models (e.g., Web Ontology Language (OWL) models).

BACKGROUND

The Web Ontology Language (OWL) may be described as a set of knowledge representation languages for authoring ontologies. An ontology may be described as formally representing knowledge as a set of concepts within a domain and representing relationships between those concepts. For example, an ontology may be used to reason about entities within a domain and may be used to describe the domain.

The Semantic Web may be described as a movement to promote common formats for data on the World Wide Web (WWW).

A growing number of customers use OWL and Semantic Web-related technologies in their analytical applications, primarily to leverage their unique capacities, such as reasoning and deep data discovery.

SUMMARY

Provided are a computer implemented method, computer program product, and system for generating a combined report. One or more queries are constructed using a Business Intelligence (BI) metadata model and one or more query declarations. The one or more queries are executed on a semantic model to obtain one or more semantic result sets. One or more data source result sets are received from one or more data sources. The one or more semantic result sets and the one or more data source result sets are combined to construct one or more combined result sets. The one or more combined result sets are rendered to form a combined report.

BRIEF DESCRIPTION OF THE SEVERAL VIEWS OF THE DRAWINGS

In the drawings, like reference numbers represent corresponding parts throughout.

FIGS. 4A and 4B illustrate an example report specification in accordance with certain embodiments.

FIGS. 5A, 5B, 5C, 5D, and 5E illustrate an example of a Group, Period, and Element in the OWL model in accordance with certain embodiments.

FIG. 7 is formed by FIG. 7A and FIG. 7B.

FIG. 8 illustrates an example query to retrieve semantic data in accordance with certain embodiments.

FIG. 9 illustrates an example of an Element instance in accordance with certain embodiments.

FIG. 10 illustrates an example report in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
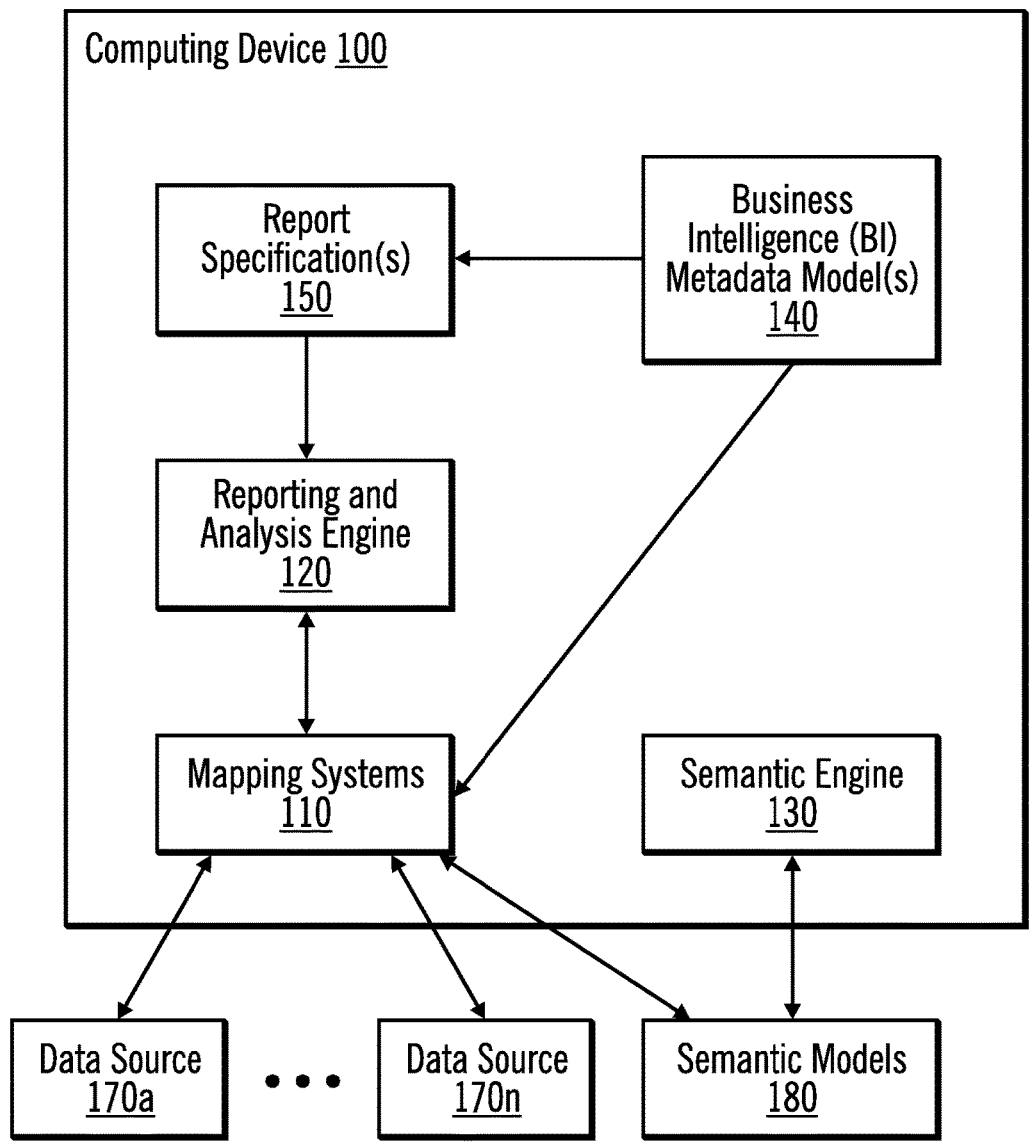
FIG. 1 illustrates, in a block diagram, a computing environment in accordance with certain embodiments.

FIG. 1 illustrates, in a block diagram, a computing environment in accordance with certain embodiments. A computing device 100 includes one or more mapping systems 110, a reporting and analysis engine 120 (i.e., a BI engine), a semantic engine 130, one or more BI metadata models 140, and one or more report specifications 150.

The one or more report specifications 150 are constructed using BI metadata models 140 that are generic (i.e., data source-independent). BI metadata may include business rules, data sources, data transformation rules, etc. A BI metadata model 140 may be described as a set of rules and constraints that are applicable to modeling BI. A BI metadata model 140 may also be described as a collection of metadata that is imported from a data source. For example, a BI metadata model 140 may describe tables (query subjects), columns (query items), and relationships in the data source.

The one or more semantic models 180 are generated and used by the semantic engine 130. The reporting and analysis engine 120 employs a number of specialized mapping systems 110, for example, one for a semantic model 180, one for relational databases, one for OLAP cubes, etc.

In particular, the semantic engine 130 creates, stores, and manages a semantic model 180. In certain embodiments, the semantic model 180 is a Web Ontology Language (OWL) model based on Web Ontology Language (OWL). The semantic model 180 may be described as representing semantic data. The semantic model 180 may be described as a conceptual data model that describes the structure of data and its meaning Semantic data may be described as data that includes semantic meaning. The reports are based on this data.

The mapping system 110 generates one or more BI metadata models 140 from the semantic model 180.

The reporting and analysis engine 120 includes Business Intelligence (BI) capabilities. The reporting and analysis engine 120 receives data from one or more data sources 170a . . . 170n. The data sources 170a . . . 170n may be any type of data sources (e.g., relational databases). In general, the reporting and analysis engine 120 generates a data source-specific query that is then executed against a data source, and the data source returns a result set. For example, for relational data sources, the reporting and analysis engine 120 may generate a Structured Query Language (SQL) query. In addition the reporting and analysis engine 120 generates a query to retrieve data from a semantic model

180. To retrieve data from a semantic store, such as semantic model 180, the reporting and analysis engine 120 may generate a SPARQL Protocol and RDF Query Language (SPARQL) query.

The reporting and analysis engine 120 allows a user to generate a report that combines information from various data sources. This report is based on the common BI metadata model 140 and ultimately is executed against one or more data sources 170a . . . 170n. The reporting and analysis engine 120 also allows users to explore, view, assemble, and analyze information in the one or more data sources 170a . . . 170n and the BI metadata model 140. The reporting and analysis engine 120 also allows users to perform predictive or what—if analysis.

The reporting and analysis engine 120 is empowered by a BI metadata model 140 that describes the layout of the data contained in each of the one or more data sources 170a . . . 170n. The layout includes details, such as data format, to higher level information such as how a group of items are related to other items. Such information is then used as building blocks to derive more complex constructs, such as queries and reports that combine information from various sources.

Figure 2:
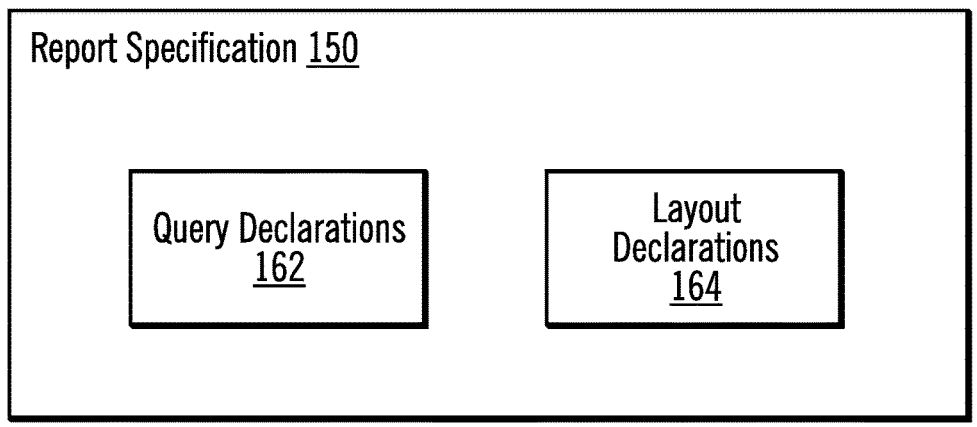
FIG. 2 illustrates, in a block diagram, details of a report in accordance with certain embodiments.

FIG. 2 illustrates, in a block diagram, details of a report specification 150 in accordance with certain embodiments. A report specification 150 includes query declarations 162 and layout declarations 164. The query declarations 162 list data to be presented in a report specification 150. The data is defined using business terms. The layout declarations 164 describe how the data is to be rendered in the report specification 150. In certain embodiments, the report specification 150 is provided by a user or system administrator.

Figure 3:
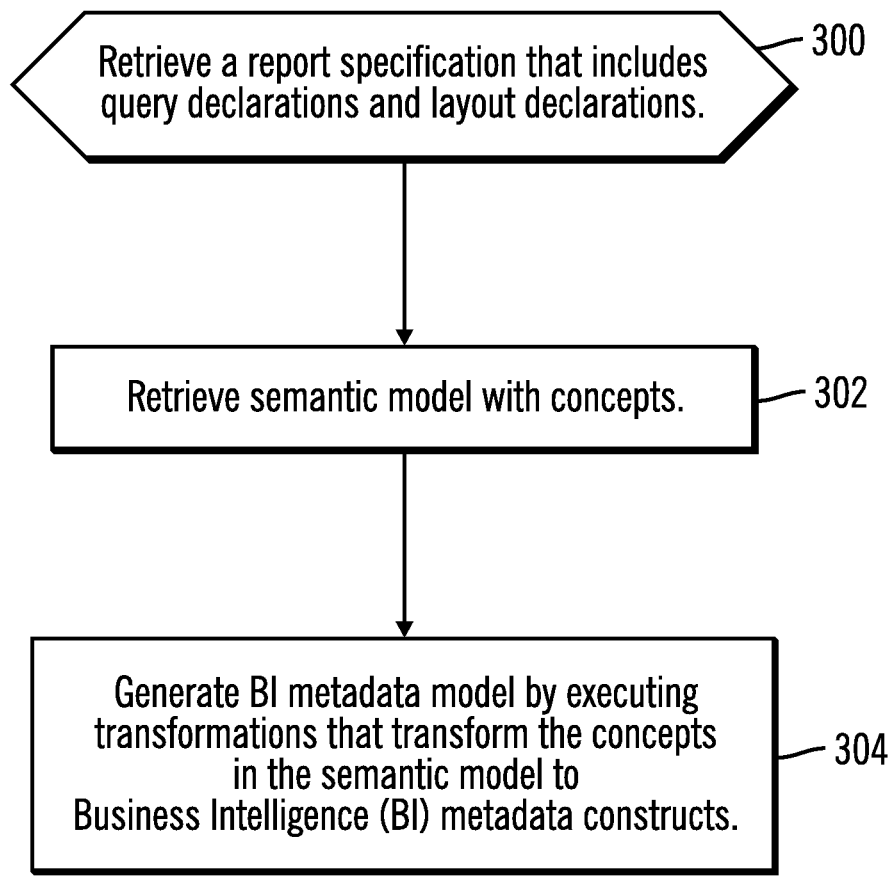
FIG. 3 illustrates, in a flow diagram, operations performed to create a BI metadata model in accordance with certain embodiments.

FIG. 3 illustrates, in a flow diagram, operations performed to create a BI metadata model 140 in accordance with certain embodiments. Control begins at block 300 with the mapping system 110 retrieving a report specification 150 that includes query declarations and layout declarations. FIGS. 4A and 4B illustrate an example report specification 400, 410 in accordance with certain embodiments. In the example report specification 400, 410, concepts are represented by the <dataItem> elements, such as Element's name, symbol, atomic number, atomic weight, group, and color.

In block 302, the mapping system 110 retrieves a semantic model 180 with concepts. FIGS. 5A, 5B, 5C, 5D, and 5E illustrate an example of a Group, Period, and Element in the OWL model 500, 510, 520, 530, 540 in accordance with certain embodiments.

In block 304, the mapping system 110 generates a BI metadata model 140 by executing transformations that transform the concepts in the semantic model 180 to Business Intelligence (BI) metadata constructs. Concepts may be described as a set of objects that share the same attributes, operations, relations, and semantics. That is, the mapping system 110 maps terms used by the reporting and analysis engine 120 (i.e., business terms) to concepts used in the semantic model 180. In certain embodiments, the mapping system 110 generates the BI metadata model 140 by constructing a query subject (used by the reporting and analysis engine 120) for each semantic class (used in the semantic model 180), constructing a query item (used by the reporting and analysis engine 120) for each semantic data type property restriction (used in the semantic model 180), constructing a relationship (used by the reporting and analysis engine 120) for each semantic object property restriction (used in the semantic model 180), constructing a shortcut (used by the reporting and analysis engine 120) for each semantic class equivalency (used in the semantic model 180), and flattening semantic class hierarchies (used in the semantic model 180) by replicating query items defined in base classes in derived classes (used by the reporting and analysis engine 120).

Figure 6:
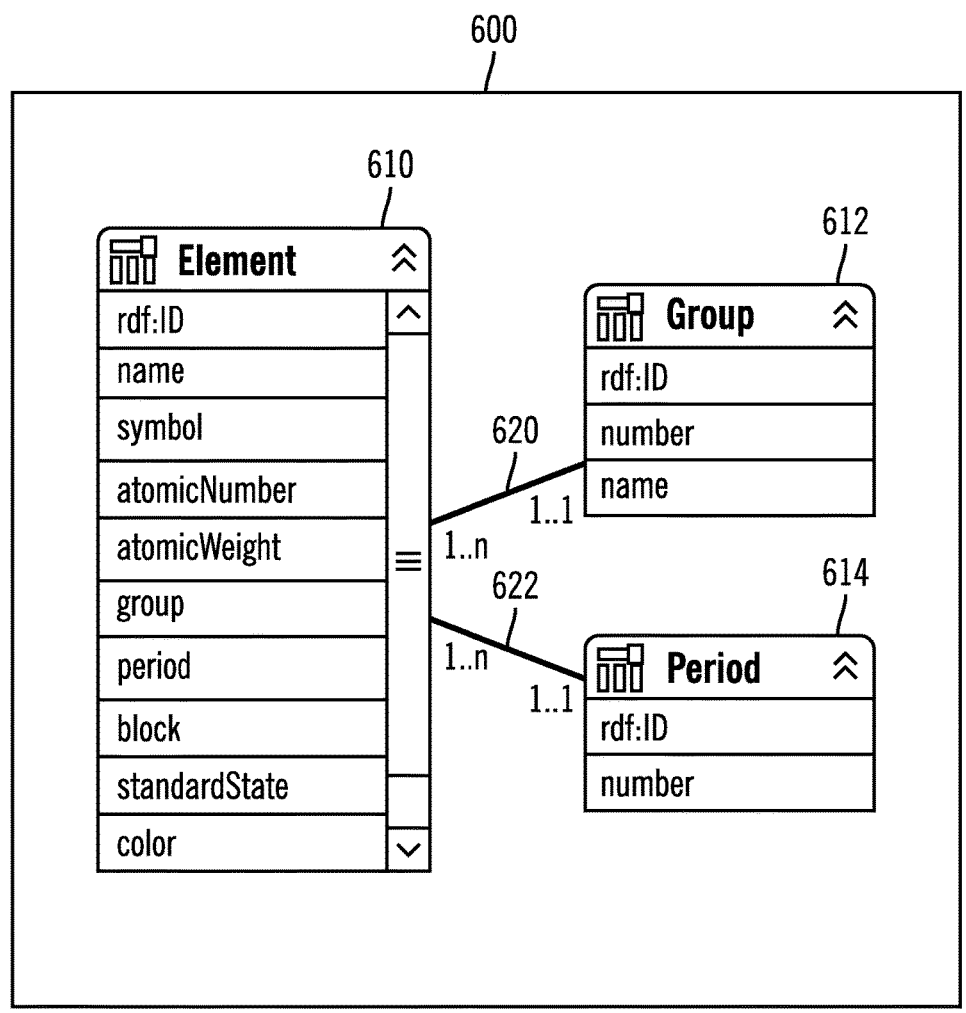
FIG. 6 illustrates a graphical representation of a BI metadata model generated for a periodic table model in accordance with certain embodiments.

FIG. 6 illustrates a graphical representation 600 of a BI metadata model generated for a periodic table model in accordance with certain embodiments. Each box represents a query subject, with the query item names listed inside each box, and the lines between query subjects indicate relationships between the query subjects. In FIG. 6, the BI metadata model represents part of an OWL ontology representing a periodic table. In FIG. 6, Element 610, Group 612, and Period 614 are query subjects generated from OWL classes of the same name. A query subject contains several query items that describe contents of that query subject. For example, the Element query subject 610 includes "rdf:ID", "name", "symbol" "atomicNumber", "atomicWeight", "group", "period", "block", "standardState", and "color" query items; the Group query subject 612 includes the "rdf:ID" and "number" query items; and the Period query subject 614 includes the "rdf:ID" and "number" query items. FIG. 6 uses lines 620, 622 with values associated with the lines 620, 622 to indicate many-to-1 relationships between the Element query subject 610 and the Group query subject 612 and between the Element query subject 610 and the Period query subject 614.

The collection of bulleted items below represents an example BI metadata model. Query subjects, representing OWL classes, contain one or more query items, representing OWL data properties. Relationships are defined between query subjects. In particular, the following collection of bulleted items provides examples of some transformations that are applied in accordance with certain embodiments. The underlined words represent BI metadata constructs in the BI metadata model 140. In particular, the BI metadata constructs are query subjects, query items, and relationships.

- OWL classes are converted to QuerySubject with a special QueryItem representing the class Uniform Resource Identifier (URI).
- Each OWL DataTypeProperty restriction is mapped to a QueryItem with corresponding data type and other physical properties. If a DataTypeProperty does not have a cardinality restriction associated with it, the QueryItem is marked as nullable.
- ObjectProperty restriction is used to construct a Relationship between the class and the property range. The cardinality restriction is used to establish the cardinality of the resulting relationship.
- Class hierarchies are flattened by repeating QueryItems of the parent class for the sub-class.
- OWL equivalentClass specifications are treated as Shortcuts.

Figure 7A:
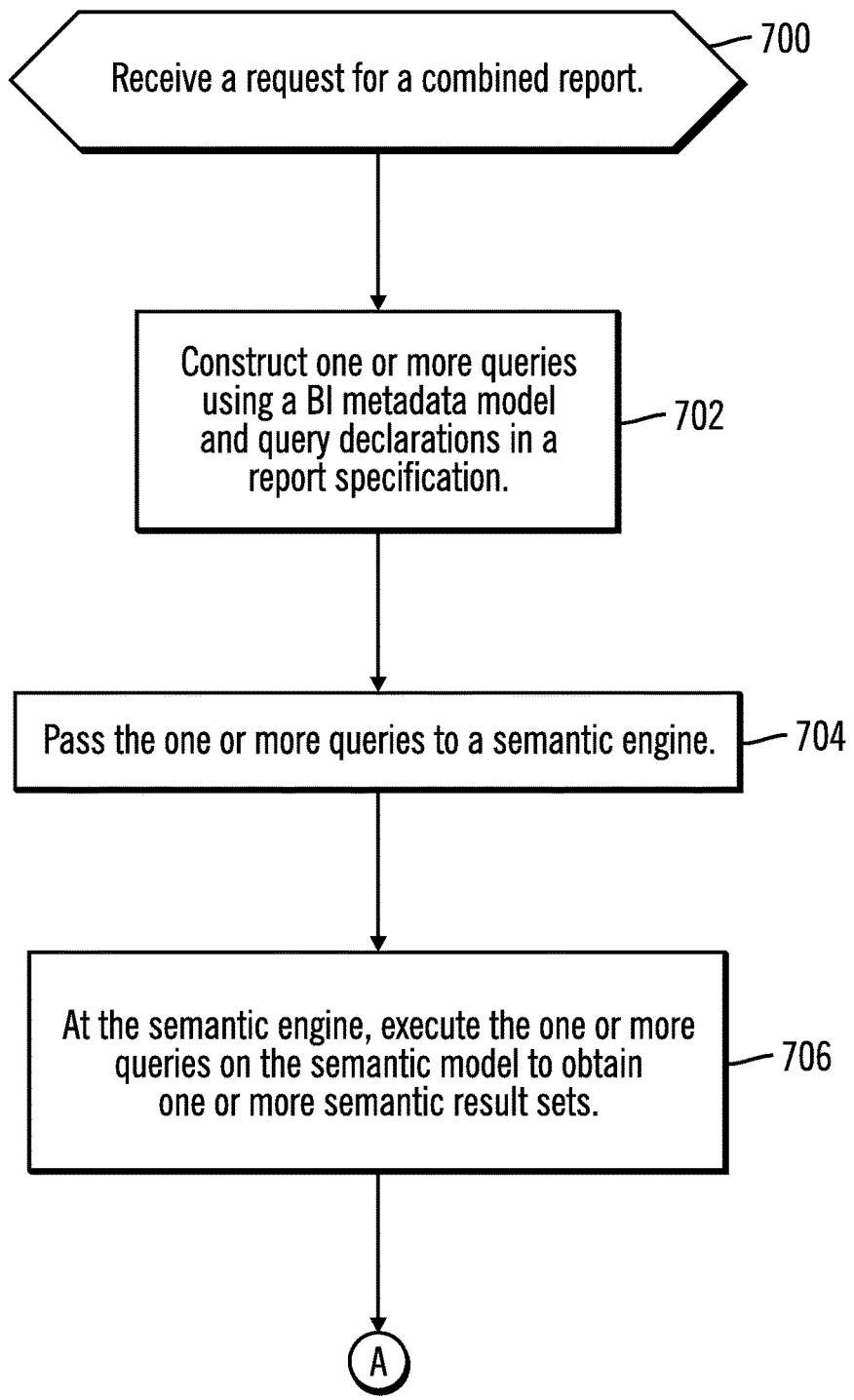
FIG. 7 illustrates, in a flow diagram, operations performed to create a combined report in accordance with certain embodiments.
Figure 7B:
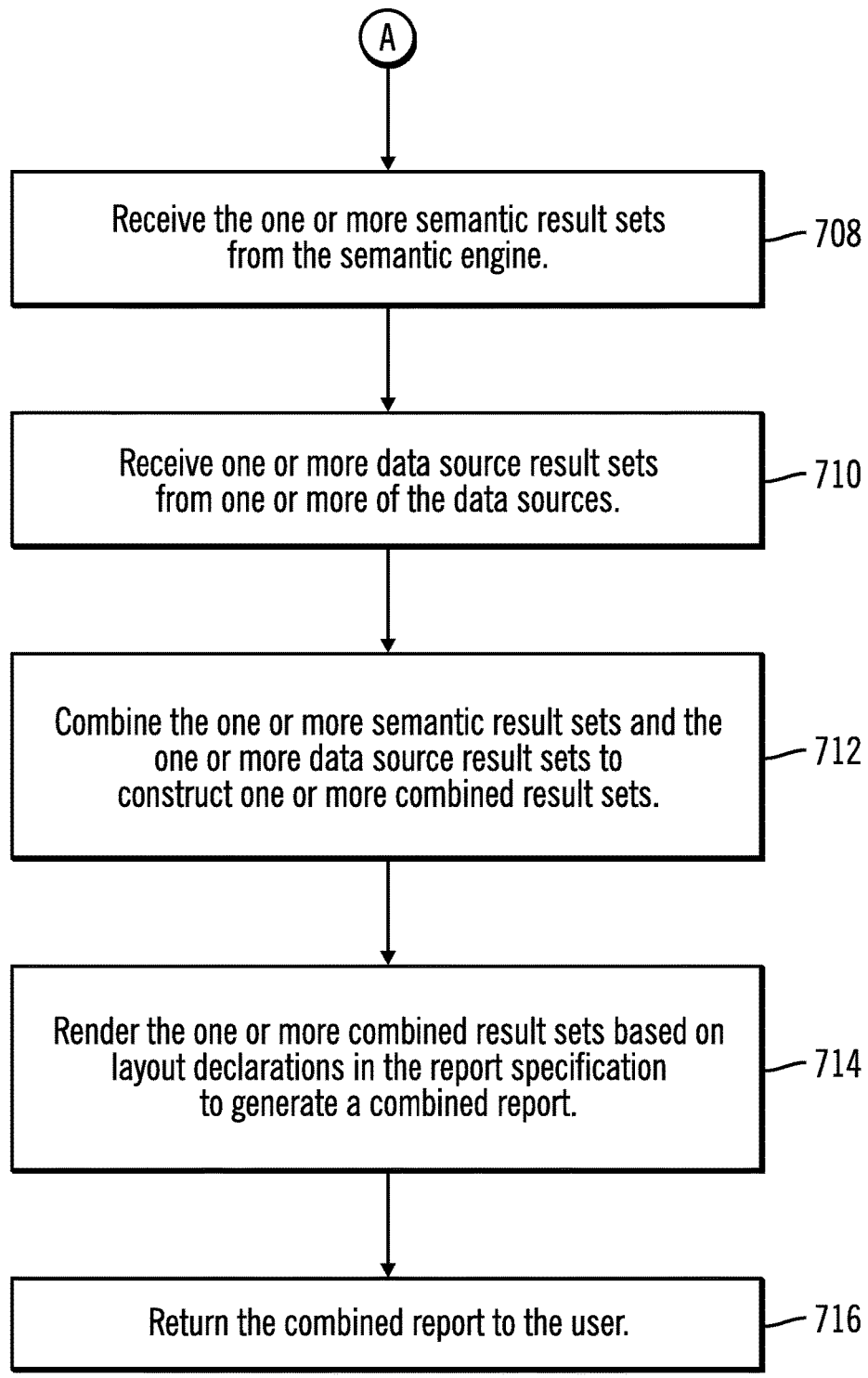

FIG. 7 illustrates, in a flow diagram, operations performed to create a combined report in accordance with certain embodiments. FIG. 7 is formed by FIG. 7A and FIG. 7B. Control begins at block 700 with the reporting and analysis engine 120 receiving a request for a combined report. In block 702, the reporting and analysis engine 120 constructs one or more queries to be passed to a semantic engine 130 using a BI metadata model and the query declarations 162 in the report specification 150. FIG. 8 illustrates an example query 800 to retrieve semantic data in accordance with certain embodiments. In block 704, the reporting and analysis engine 120 passes the one or more queries to a semantic engine 130. In block 706, the semantic engine 130 executes the one or more queries on the semantic model to obtain one or more semantic result sets. FIG. 9 illustrates an example of a semantic result set in accordance with certain embodiments. In particular, FIG. 9 illustrates an example of an Element instance (iron) 900 in accordance with certain embodiments. The Element instance 900 provides concrete data values for different characteristics of the Element. For this example, assume that there are class definitions for Element, and a series of instances for the Element class, with instance 900 being an example of one instance. The definition for class Element describes various characteristics of an element in the periodic table.

In block 708, the reporting and analysis engine 120 receives one or more semantic result sets from the semantic engine 130. In block 710, the reporting and analysis engine 120 receives one or more data source result sets from one or more of the data sources 170a . . . 170n. In certain embodiments, receiving the one or more data source result sets includes requesting or retrieving the one or more data source result sets. In block 712, the reporting and analysis engine 120 combines the one or more semantic result sets and the one or more data source result sets to construct one or more combined result sets (e.g., business oriented result sets).

In block 714, the reporting and analysis engine 120 renders the one or more combined result sets based on layout declarations in the report specification 150 to generate a combined report. FIG. 10 illustrates an example report 1000 in accordance with certain embodiments. In block 716, the reporting and analysis engine 120 returns the combined report to the user.

BI metadata constructs in a BI metadata model 140 and concepts in a semantic model 180 are mapped to each other. For example, OWL class definitions (in a semantic model 180) are mapped to BI metadata constructs (e.g., query subject, query item, and relationship in a BI metadata model 140) used by the reporting an analysis engine 120.

Following the metadata mapping, a user may pose various queries against the periodic table instance data, taking advantage of a wide range of reporting, visualization, and distribution capabilities of the reporting and analysis engine 120.

For example, consider the list of elements organized by their groups as a simple query, which is translated to a source-neutral query such as the following Query 1:

```
SELECT
  Group0.name AS name1, Element.name AS name, Element.symbol AS symbol,
  Element.atomicNumber AS atomicNumber, Element.atomicWeight AS atomicWeight,
  Element.color AS color
FROM
  Element Element INNER JOIN Group Group0 ON Element.group = Group0."rdf:ID"
ORDER BY
  name1 ASC
```

Resource Description Framework (RDF) may be described as a metadata data model. The reporting and analysis engine 120 translates Query 1 to SPARQL Protocol and RDF Query Language (SPARQL) to be sent to the semantic engine 130 as the following:

```
PREFIX : <http://www.daml.org/2003/01/periodictable/PeriodicTable#>
PREFIX rdf: <http://www.w3.org/1999/02/22-rdf-syntax-ns#>
SELECT ?Group0_name ?Element_name ?Element_symbol
  ?Element_atomicNumber ?Element_atomicWeight
WHERE {
```

-continued

```
  ?s0 rdf:type :Element .
  ?s0 :name ?Element_name .
  ?s0 :symbol ?Element_symbol .
  ?s0 :atomicNumber ?Element_atomicNumber .
  OPTIONAL {
  ?s0 :atomicWeight ?Element_atomicWeight . }
  ?s0 :group ?Element_group .
  OPTIONAL { ?s0 :color ?Element_color . }
  ?s1 rdf:type :Group .
  ?s1 :name ?Group0_name .
  FILTER( ?Element_group = ?s1 )
}
ORDER BY ASC(?Group0_name)
```

Embodiments extend the reach of BI applications to semantic models expressed in OWL. This is achieved by mapping OWL concepts to BI metadata constructs in a BI metadata model 140 that are used by a BI application suite, such as reporting and analysis engine 120.

As an example of use, consider a recommendation system that makes recommendations based on users' past selections. Suppose a company manages a semantic system based on an OWL hierarchy of its product offerings (e.g. books or movies) and customer information (e.g., past orders and basic information such as address etc.). Now, assume the company wants to analyze customers' past purchases to get a sense of geographic distribution of its overall earning per state; visualize the findings and distribute them among peers/executives; and carry out planning and forecasting for its future revenues. Embodiments provide an on-the-fly mapping between source-target constructs in the metadata model 140 and the semantic model 180 and the ability to query directly data instances stored in the semantic model.

Thus, embodiments extend the coverage to another data source (i.e., the BI metadata model 140) beyond the one or more data sources 170a . . . 170n.

The mapping system 110 enables a BI application to access the instance data stored in a semantic model 180. That is, embodiments enable querying instance data stored within a semantic model in the context of a BI system. Embodiments are concerned with BI metadata concepts (e.g., classes in OWL and BI metadata constructs used in a BI application).

Embodiments offer an integrated and seamless solution where the reasoning engine and artifacts are available to the BI application as yet another information source that can be queried and reported against.

Embodiments make available OWL models to a full range of reporting and analysis capabilities for BI applications Embodiments integrate the results of semantic processes into the more traditional business analytic artifacts. Embodiments serialize the result of a semantic engine into an intermediate medium, such as eXtensible Markup Language (XML), which subsequently is imported into a BI application to be used along with the rest of information sources.

Embodiments extend the reach of a BI tool with a set of existing capabilities for visualization, analytics, etc. and allowing high-level business-oriented query capability, to tap into a semantic data source (i.e., a semantic model) through a mapping between high-level business metadata constructs and concepts.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 11:
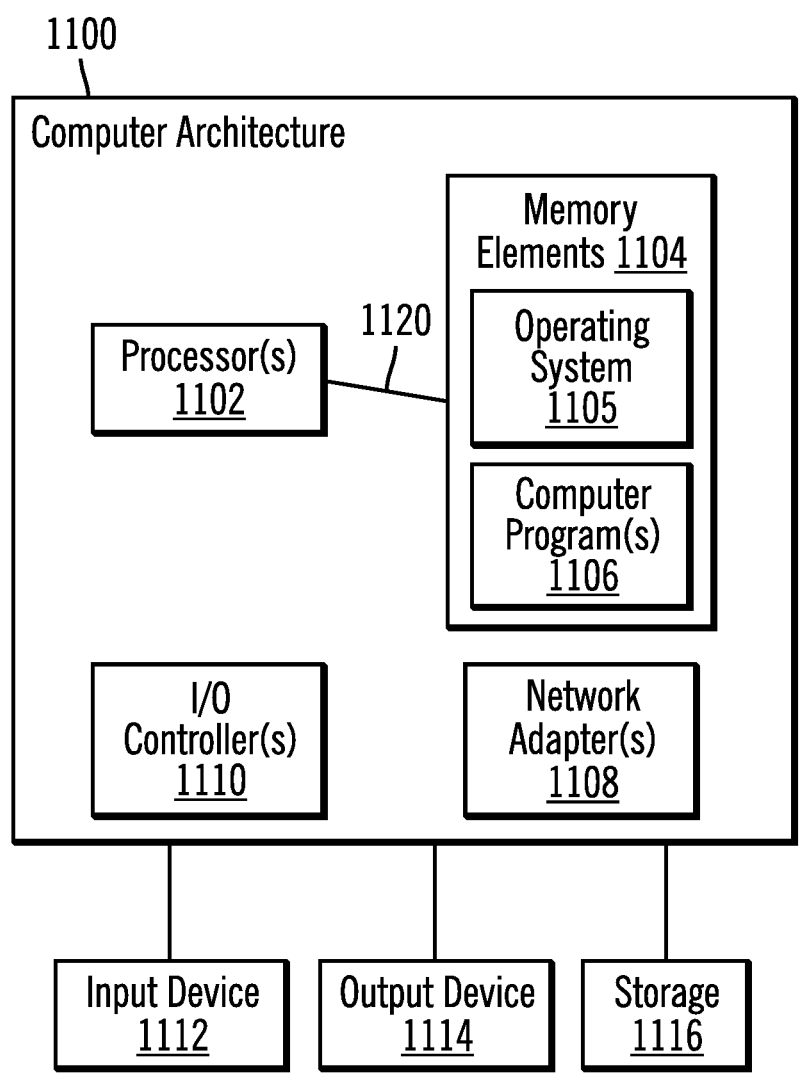
FIG. 11 illustrates, in a block diagram, a computer architecture that may be used in accordance with certain embodiments.

FIG. 11 illustrates a computer architecture 1100 that may be used in accordance with certain embodiments. Computing device 100 may implement computer architecture 1100. The computer architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The computer architecture 1100 may be coupled to storage 1116 (e.g., any type of storage device; a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The computer architecture 1100 may include fewer components than illustrated, additional components not illustrated herein, or some combination of the components illustrated and additional components. The computer architecture 1100 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:
1. A method, comprising:
    retrieving, with a processor of a computer, a report specification that includes one or more query declara- tions of data to be presented and one or more layout declarations describing how the data is to be rendered;

retrieving a semantic model with concepts, wherein the semantic model comprises a Web Ontology Language (OWL) model;

generating a Business Intelligence (BI) metadata model by executing transformations that transform concepts in the semantic model to BI metadata constructs by:
constructing a table for each semantic class in the semantic model;
constructing a column for each semantic data type property restriction; and
constructing a relationship for each semantic object property restriction;

receiving a request for a combined report that combines result sets from the semantic model and one or more relational data sources comprising relational databases;

constructing one or more first queries using the BI metadata model and one or more query declarations;

executing the one or more first queries on the semantic model to obtain one or more semantic result sets;

executing one or more second queries against one or more relational data sources to obtain one or more relational data source result sets;

combining the one or more semantic result sets and the one or more relational data source result sets to construct one or more combined result sets; and rendering the one or more combined result sets to form a combined report based on the one or more layout declarations.

2. The method of claim 1, wherein a semantic engine executes the one or more first queries on the semantic model to obtain the one or more semantic result sets.

3. The method of claim 1, further comprising:
generating, for the BI metadata model, a graphical representation for each table described in the BI metadata model, wherein each of the graphical representations includes columns for that table, and wherein lines between the graphical representations indicate relationships between the tables.

* * * * *